United States Patent
Liang et al.

(10) Patent No.: US 8,982,544 B2
(45) Date of Patent: Mar. 17, 2015

(54) HOUSING AND ELECTRONIC DEVICE

(75) Inventors: Yan Liang, Shenzhen (CN); Jian-Zhou Zhao, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 302 days.

(21) Appl. No.: 13/531,396

(22) Filed: Jun. 22, 2012

(65) Prior Publication Data
US 2013/0120914 A1 May 16, 2013

(30) Foreign Application Priority Data

Nov. 11, 2011 (CN) .......................... 2011 1 0356876

(51) Int. Cl.
*H05K 5/00* (2006.01)
*H05K 7/00* (2006.01)
*G06F 1/16* (2006.01)

(52) U.S. Cl.
CPC .................................... *G06F 1/1626* (2013.01)
USPC ............. 361/679.21; 361/679.22; 361/679.26

(58) Field of Classification Search
USPC ................ 361/679.3, 679.21, 679.22, 679.26
See application file for complete search history.

(56) References Cited

U.S. PATENT DOCUMENTS

| | | | |
|---|---|---|---|
| 6,532,152 B1 * | 3/2003 | White et al. | 361/692 |
| 8,014,142 B2 * | 9/2011 | Prest et al. | 361/679.3 |
| 8,050,028 B2 | 11/2011 | Merz et al. | |
| 2009/0237874 A1 * | 9/2009 | Prest et al. | 361/679.01 |

FOREIGN PATENT DOCUMENTS

TW    M374248    2/2010

* cited by examiner

*Primary Examiner* — Anthony Haughton
(74) *Attorney, Agent, or Firm* — Novak Druce Connolly Bove + Quigg LLP

(57) ABSTRACT

A housing includes a base housing and a reinforcing frame fixed with the base housing. The base housing includes a base plate, a peripheral sidewall extending outward from a peripheral edge of the base plate, and an inclined supporting peripheral wall extending inward from a distal end of the peripheral side wall toward a central portion of the base plate. The reinforcing frame is securely mounted on the inclined supporting peripheral wall of the base housing. The reinforcing frame includes a mounting portion having an inclined bottom surface resisting against and fixing with the corresponding inclined supporting peripheral wall of the base housing. An electronic device using the housing is also provided.

16 Claims, 5 Drawing Sheets

HOUSING AND ELECTRONIC DEVICE

BACKGROUND

1. Technical Field

The present disclosure generally relates to housing structures, and particularly to a housing and an electronic device using the housing.

2. Description of Related Art

Many electronic devices are equipped with metal housings. In order to decrease a whole weight and a whole thickness of the electronic device, the metal housing is designed to be very thin thus decreasing the strength of the whole structure. In order to increase and ensure the strength of the whole structure of the metal housing, an existing metal housing of an electronic device includes a base housing and a reinforcing frame fixed with the base housing. Generally, the reinforcing frame is welded to the housing. During a welding process, a welding portion of the housing can be easily distorted or warped by the welding process, the whole structure strength and the appearance of the metal housing may easily affected.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure.

DETAILED DESCRIPTION

Figure 1:
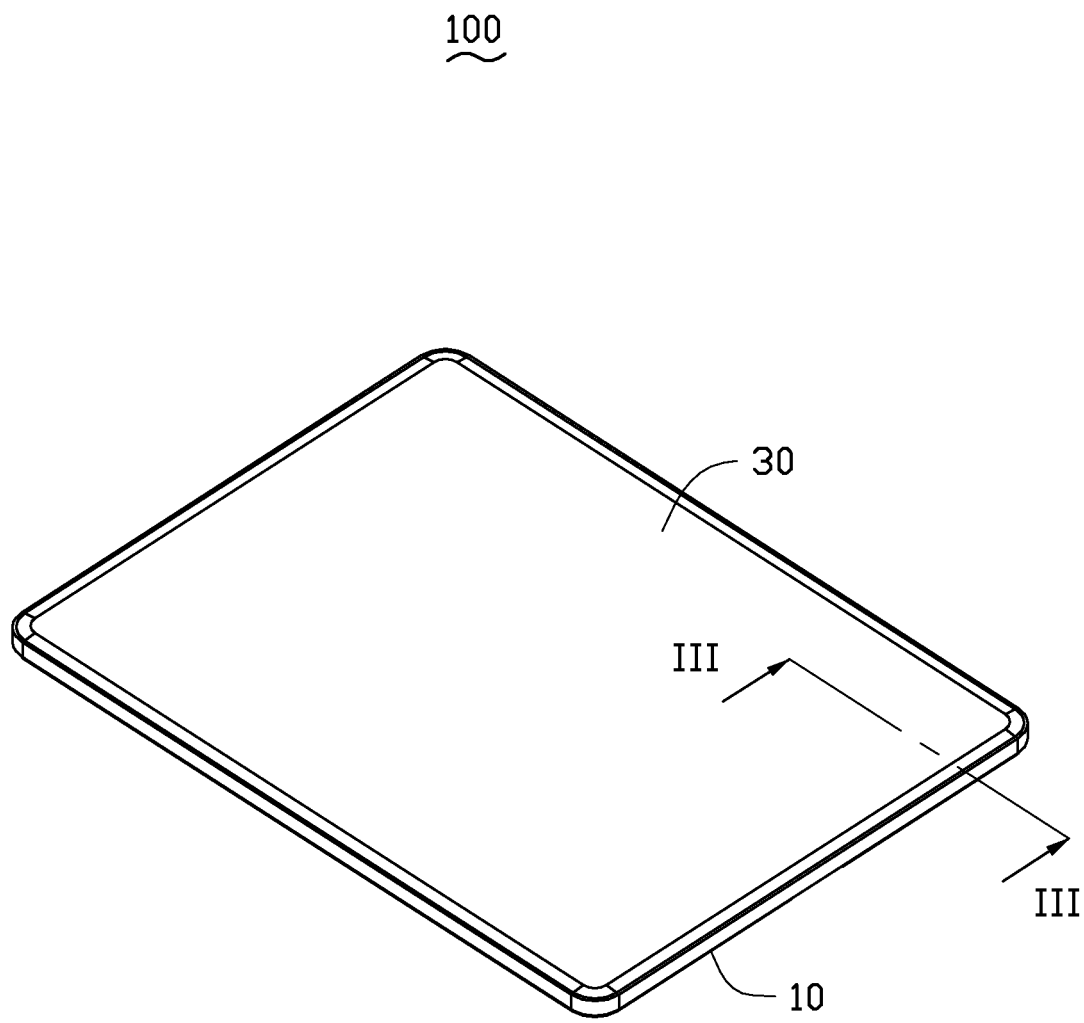
FIG. 1 shows an assembled isometric view of an embodiment of an electronic device.
Figure 2:
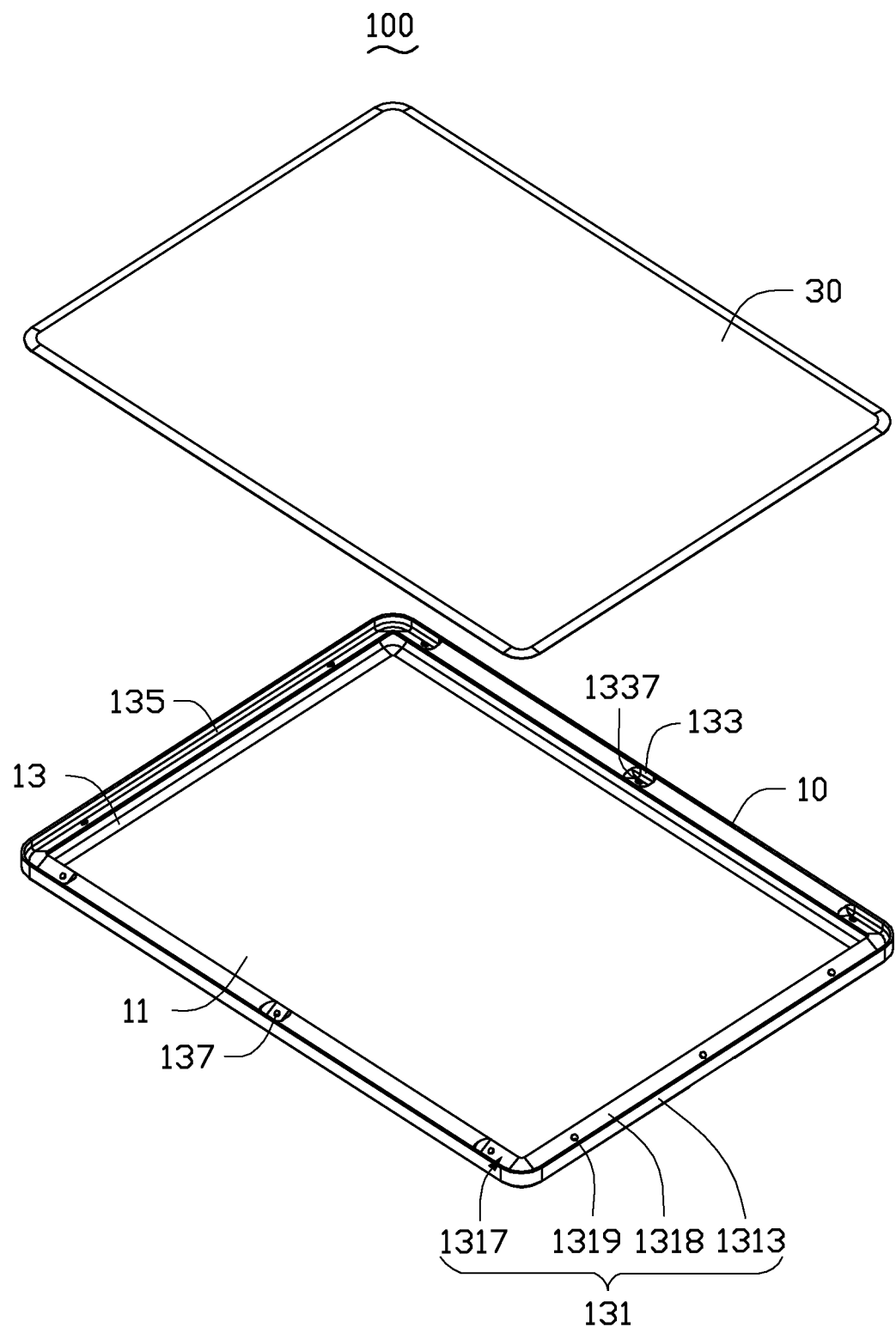
FIG. 2 shows an exploded, isometric view of the electronic device of FIG. 1.
Figure 3:
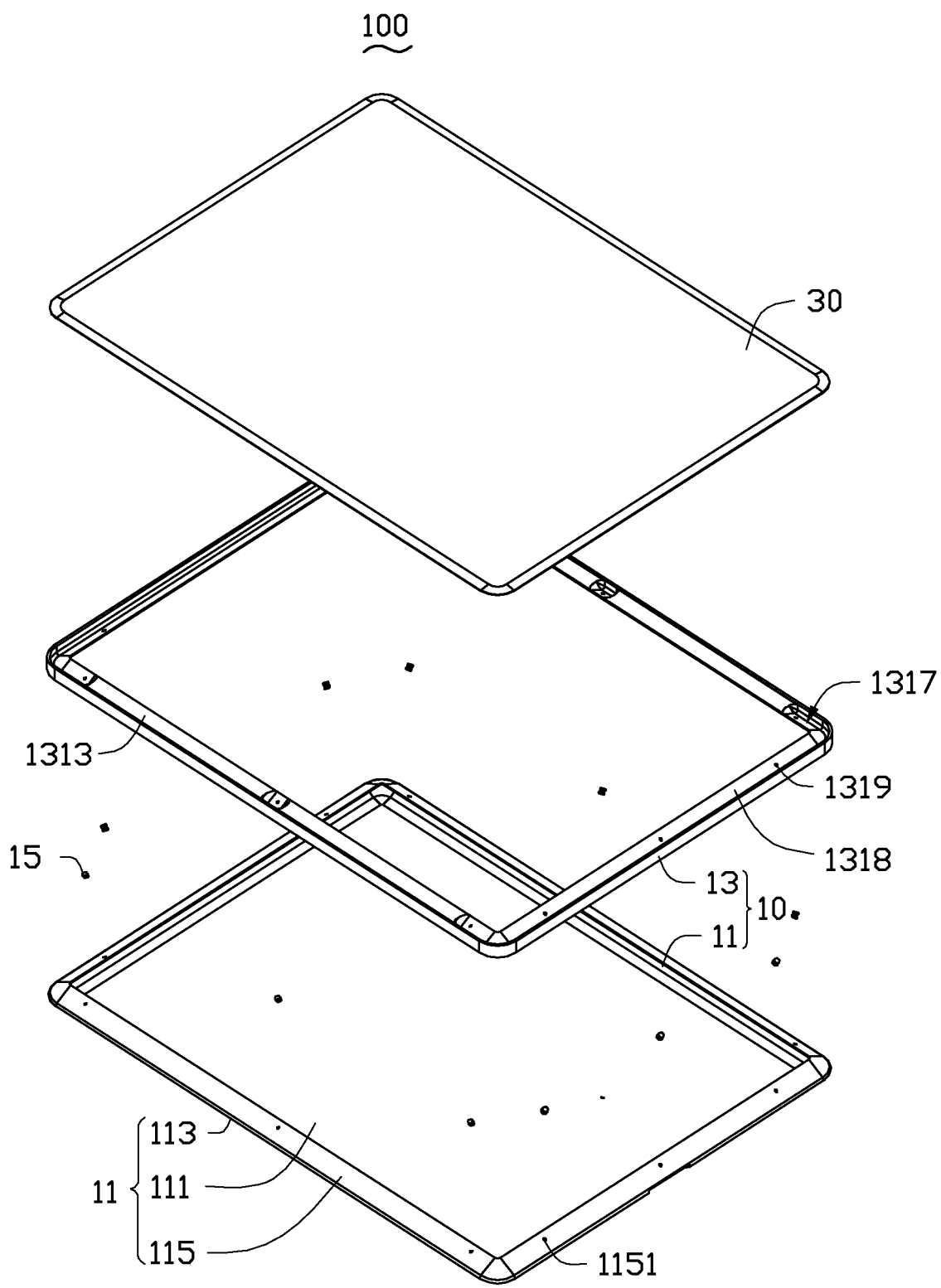
FIG. 3 shows an exploded, isometric view of the electronic device of FIG. 2.

FIGS. 1 through 3, illustrate an embodiment of an electronic device 100. The electronic device 100 includes a housing 10 and a display screen 30 mounted to the housing 10. The electronic device 100 can be a tablet computer, a mobile phone, an MP3, a PDA, an LCD, or a camera, for example. In the illustrated embodiment, the electronic device 100 is a tablet computer. The electronic device 100 may also include other functional modules to fulfill different functions; however, it is not shown and specifically described for simplification. The housing 10 includes a base housing 11, a reinforcing frame 13, and a plurality of rivets 15 for fixing the base housing 11 and the reinforcing frame 13 together. In the illustrated embodiment, the base housing 11 and the reinforcing frame 13 are both formed by stamping process.

Figure 5:
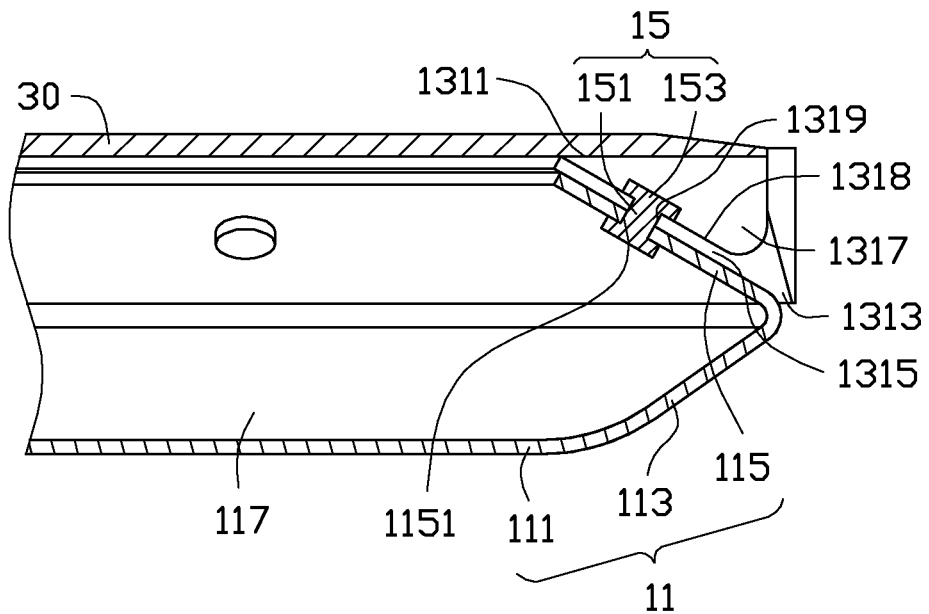
FIG. 5 shows a cross-sectional view of the electronic device, taken along line III-III of FIG. 1.

FIG. 5 shows the base housing 11 of the illustrated embodiment. The base housing 11 includes a base plate 111, a peripheral sidewall 113 slantwise extending outward from a peripheral edge of the base plate 111, and an inclined supporting peripheral wall 115 extending inward from a distal end of the peripheral side wall 113 toward a central portion of the base plate 111. In the illustrated embodiment, the base plate 111 is a substantially rectangular plate. The peripheral sidewall 113 and the base plate 111 cooperatively define an obtuse angle. A conjunction portion of the peripheral sidewall 113 and the base plate 111 is substantially arc-shaped. The inclined supporting peripheral wall 115 is substantially rectangular ring-shaped, and forms a substantially acute angle with the peripheral side wall 113. The base plate 111, the peripheral side wall 113, and the inclined supporting peripheral wall 115 cooperatively define a receiving space 117, for assembling and receiving the functional modules. A plurality of mounting holes 1151 are separately defined through the inclined supporting peripheral wall 115 along a peripheral direction of the inclined supporting peripheral wall 115. The base plate 111 is made of metal material, such as aluminum alloy, magnesium alloy, titanium alloy, or stainless steel.

Figure 4:
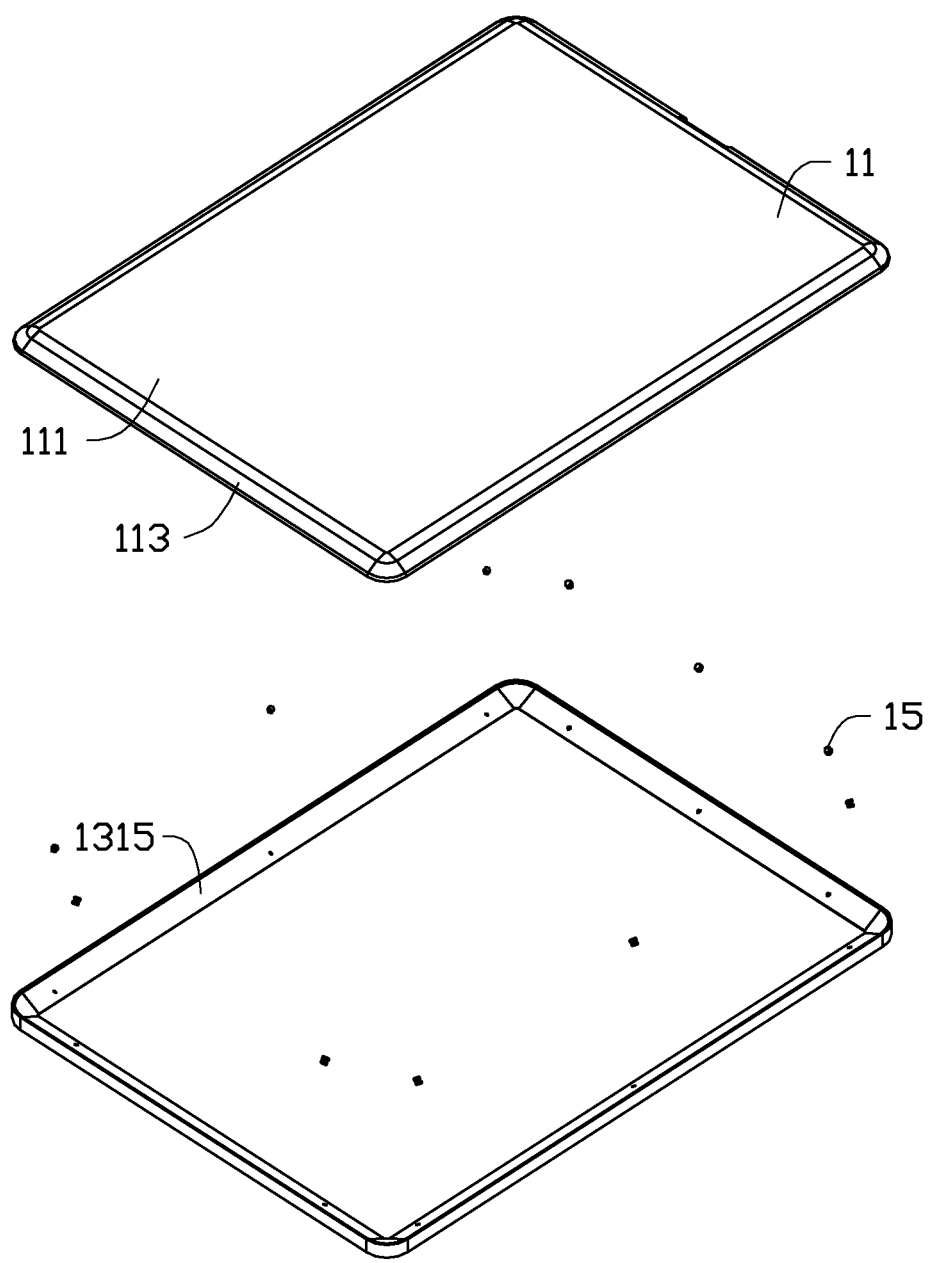
FIG. 4 shows an exploded, isometric view of a housing of the electric device of FIG. 3.

Also referring to FIG. 4, the reinforcing frame 13 is fixed to the inclined supporting peripheral wall 115 by the plurality of rivets 15. The reinforcing frame 13 is substantially hollow rectangular ring-shaped, and includes a first mounting portion 131, a second mounting portion 133, a third mounting portion 135, and a fourth mounting portion 137. The first mounting portion 131, the second mounting portion 133, the third mounting portion 135, and the fourth mounting portion 137 are connected together in that order. The first mounting portion 131 is positioned parallel to the third mounting portion 135, the second mounting portion 133 is parallel to the fourth mounting portion 137.

The first mounting portion 131 includes a top surface 1311, a side surface 1313, an inclined bottom surface 1315 connecting with the top surface 1311 and the side surface 1313. The side surface 1313 is substantially perpendicular to the top surface 1311. The inclined bottom surface 1315 is parallel to the inclined supporting peripheral wall 115 of the base housing 11. A substantially rectangular mounting groove 1317 is recessed from the top surface 1311. The mounting groove 1317 has a fixing inclined surface 1318 substantially parallel to the inclined bottom surface 1315. The fixing inclined surface 1318 defines a plurality of the fixing holes 1319 corresponding to the mounting holes 1151 of the base housing 10. In the illustrated embodiment, there are three fixing holes 1319 separately defined through the fixing inclined surface 1318. The top surface 1311 and a top portion of the side surface 1313 are for supporting the display screen 30. The third mounting portion 133 has a shape and structure substantially the same as that of the first mounting portion 131. The second mounting portion 133 and the fourth mounting portion 137 both have substantially the same shape as that of the first mounting portion 131, a difference is that the second mounting portion 133 and the fourth mounting portion 137 each defines three substantially rectangular mounting slots 1337 corresponding to the mounting holes 1151 of the base housing 10.

In the illustrated embodiment, the reinforcing frame 13 is made of light metal such as aluminum alloy, magnesium alloy, titanium alloy, or stainless steel.

The rivet 15 includes a fastening portion 151 and an end portion 153 formed at one end of the fastening portion 151.

The display screen 30 is securely mounted on the top surface 1311 of the reinforcing frame 13 and resists against the top portion of the side surface 1313. The display screen 30 is coplanar with the top portion of the reinforcing frame 13.

In assembly, the reinforcing frame 13 is first mounted on one surface of the inclined supporting peripheral wall 115 of the base housing 11 away from the base plate 111. The rivets 15 pass through the fixing holes 1319 of the reinforcing frame 13 and the mounting holes 1151 of the base housing 10, thereby fastening the reinforcing frame 13 and the base housing 11 together by a rivet tool. The end portions 153 of the rivets 15 are respectively received within the mounting groove 1317 and the mounting slots 1337 of the reinforcing frame 13. The display screen 30 is finally mounted on the top surface 1311 of the reinforcing frame 13, coplanar with the top portion of the reinforcing frame 13 to finish the assembly of the electronic device 100.

In one embodiment, the base housing 11 and the reinforcing frame 13 may be fixed together by glue or a special latching structure.

While various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A housing comprising:
   a base housing comprising a base plate, a peripheral sidewall extending outward from a peripheral edge of the base plate, and an inclined supporting peripheral wall extending inward from a distal end of the peripheral side wall toward a central portion of the base plate; and
   a reinforcing frame fixedly mounted on the inclined supporting peripheral wall of the base housing; wherein, the reinforcing frame comprises a mounting portion having an inclined bottom surface parallel to the inclined supporting peripheral wall of the base housing, and the inclined bottom surface resists against and fixes with one surface of the inclined supporting peripheral wall away from the base housing.

2. The housing of claim 1, wherein the inclined supporting peripheral wall comprises a plurality of mounting holes defined through the inclined supporting peripheral wall along a peripheral direction of the inclined supporting peripheral wall, separately, the housing further comprises a plurality of rivets, the rivets pass through the mounting holes of the reinforcing frame and fixed with the base housing.

3. The housing of claim 1, wherein the peripheral sidewall and the base plate cooperatively define an obtuse angle, the inclined supporting peripheral wall forms a substantially acute angle with the peripheral side wall.

4. The housing of claim 2, wherein the base housing and the reinforcing frame are both formed by stamping process.

5. The housing of claim 3, wherein a conjunction portion of the peripheral sidewall and the base plate is substantially arc-shaped, the base plate, the peripheral side wall, and the inclined supporting peripheral wall cooperatively define a receiving space.

6. The housing of claim 4, wherein the base plate is made of aluminum alloy, magnesium alloy, titanium alloy, or stainless steel.

7. The housing of claim 6, wherein, the reinforcing frame is substantially hollow ring-shaped, and comprises a first mounting portion, a second mounting portion, a third mounting portion, and a fourth mounting portion connected together in that order.

8. The housing of claim 7, wherein the first mounting portion is positioned parallel to the third mounting portion, the second mounting portion is parallel to the fourth mounting portion.

9. The housing of claim 7, wherein the first mounting portion comprises a top surface, a side surface, the inclined bottom surface connecting with the top surface and the side surface, the side surface is substantially perpendicular to the top surface, the top surface defines a mounting groove recessing from the top surface, the mounting groove having a fixing inclined surface parallel to the inclined bottom surface, and the top surface further defines a plurality of the fixing holes on the fixing inclined surface corresponding to the mounting holes of the base housing; the rivets pass through the fixing holes of the reinforcing frame and the mounting holes of the base housing, thereby fixing the reinforcing frame and the base housing together; the second mounting portion, the third mounting portion and the fourth mounting portion each have substantially the same shape as that of the first mounting portion.

10. An electronic device, comprising:
    a housing comprising:
       a base housing comprising a base plate, a peripheral sidewall extending outward from a peripheral edge of the base plate, and an inclined supporting peripheral wall extending inward from a distal end of the peripheral side wall toward a central portion of the base plate; and
       a reinforcing frame fixedly mounted on the inclined supporting peripheral wall of the base housing; wherein, the reinforcing frame comprises a mounting portion having an inclined bottom surface parallel to the inclined supporting peripheral wall of the base housing, and the inclined bottom surface resists against and fixes with one surface of the inclined supporting peripheral wall away from the base housing; and
    a display screen fixedly mounted on the top surface of the reinforcing frame and resisting against the top portion of the side surface.

11. The electronic device of claim 10, wherein the display screen is coplanar with the top portion of the reinforcing frame.

12. The electronic device of claim 11, wherein the inclined supporting peripheral wall comprises a plurality of mounting holes defined through the inclined supporting peripheral wall along a peripheral direction of the inclined supporting peripheral wall, separately, the housing further comprises a plurality of rivets, the rivets pass through the mounting holes of the reinforcing frame and fixed with the base housing.

13. The electronic device of claim 12, wherein the peripheral sidewall and the base plate cooperatively define an obtuse angle, the inclined supporting peripheral wall forms a substantially acute angle with the peripheral side wall.

14. The electronic device of claim 13, wherein a conjunction portion of the peripheral sidewall and the base plate is substantially arc-shaped, the base plate, the peripheral side wall, and the inclined supporting peripheral wall cooperatively define a receiving space.

15. The electronic device of claim 14, wherein the reinforcing frame is substantially hollow ring-shaped, and comprises a first mounting portion, a second mounting portion, a third mounting portion, and a fourth mounting portion connected together in that order.

16. The electronic device of claim 15, wherein the first mounting portion comprises a top surface, a side surface, the inclined bottom surface connecting with the top surface and the side surface, the side surface is substantially perpendicular to the top surface, the top surface defines a mounting groove recessing from the top surface, the mounting groove having a fixing inclined surface parallel to the inclined bottom surface, and the top surface further defines a plurality of the fixing holes on the fixing inclined surface corresponding to the mounting holes of the base housing; the rivets pass through the fixing holes of the reinforcing frame and the mounting holes of the base housing, thereby fixing the reinforcing frame and the base housing together; the second mounting portion, the third mounting portion and the fourth mounting portion each have substantially the same shape as that of the first mounting portion.

* * * * *